UNITED STATES PATENT OFFICE.

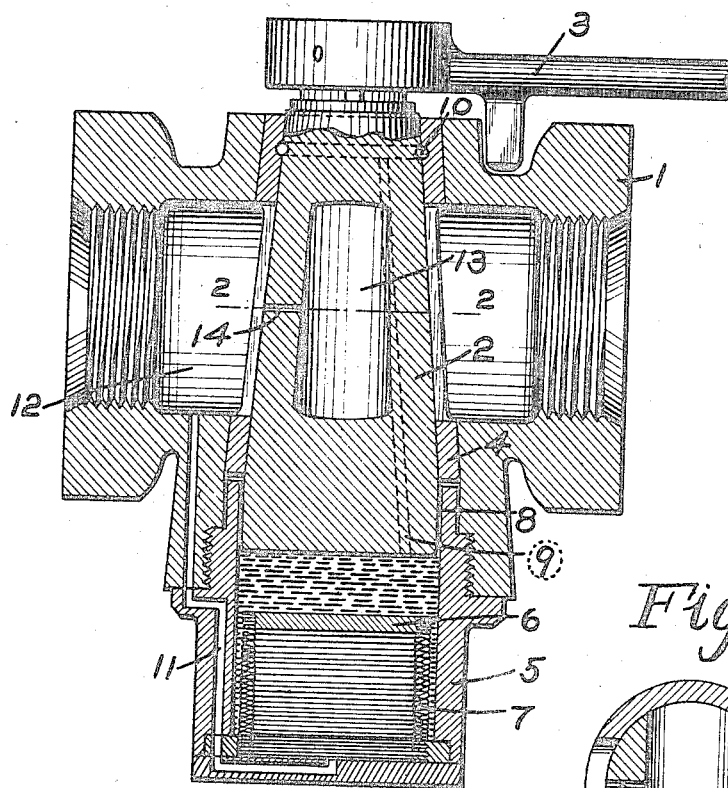

HENRY H. WESTINGHOUSE, OF NEW YORK, N. Y., ASSIGNOR TO THE WESTINGHOUSE AIR BRAKE COMPANY, OF WILMERDING, PENNSYLVANIA, A CORPORATION OF PENNSYLVANIA.

LUBRICATING DEVICE.

1,400,647.   Specification of Letters Patent.   Patented Dec. 20, 1921.

Application filed September 20, 1919. Serial No. 325,132.

*To all whom it may concern:*

Be it known that I, HENRY H. WESTINGHOUSE, of the borough of Manhattan, in the city, county, and State of New York, have invented certain new and useful Improvements in Lubricating Devices, of which the following is a specification.

This invention relates to means for lubricating valves more particularly of the plug type, such as train pipe angle and cut-out cocks.

The principal object of my invention is to provide an improved lubricating means of the above character.

In the accompanying drawing, Figure 1 is a vertical central section of a cut-out cock, showing my invention applied thereto; Fig. 2 a section on the line 2—2 of Fig. 1; and Fig. 3 a sectional view of a portion of a cut-out cock, showing a modification of my invention applied thereto.

In Fig. 1 of the drawing is shown a cut-out cock comprising a cock body 1, containing a tapered plug valve 2 adapted to be operated by handle 3, the usual bushing 4 being interposed between the valve 2 and the body 1.

At the larger end of the valve, the body 1 is extended to form a chamber into which a cap nut 5 is adapted to be screwed.

Within the cap nut 5 is mounted a movable member, such as piston head 6, which is secured to the base of the cap by means of a section of corrugated flexible tubing 7.

The valve 2 is provided with a projecting portion which extends into the chamber formed in the body and the cap nut 5 is provided with a cylindrically extended portion 8 adapted to substantially fill the space between the body and the valve when the cap nut is screwed home.

In operation, the cap nut being removed is filled with a grease lubricant to the level of the outer edge of the portion 8 and is then screwed into the body 1. As the cap nut is screwed in, the projecting portion of the valve 2 acts through the lubricant to force the piston head 6 outwardly against the spring resistance of the corrugated tube 7, so that when the cap nut 5 is screwed home, the parts will be positioned as shown in Fig. 1 of the drawing, with the piston head 6 exerting a pressure on the lubricant.

The bushing 4 is provided with grooves 9 extending longitudinally of the bushing and opening into an annular groove 10 at the upper end of the bushing, so that the lubricant above the piston head 6 will be forced, by the pressure of the tube 7, through the grooves 9 to the groove 10, whence the lubricant works between the bearing faces of the valve and the bushing.

The valve is thus automatically lubricated, so as to prevent sticking and leakage.

In order to balance the fluid pressure on the valve 2 and prevent same from being unseated, a port 11 may be provided from the pressure side of the cock conduit 12 to the chamber below the piston head 6.

When the valve 2 is in its closed position, with fluid pressure in the conduit 12 at the side which is not connected to the chamber below the piston head 6, then there is a possibility of leakage of fluid pressure around the valve to the cock passage 13, which has a tendency to unseat the valve.

In order to prevent the accumulation of pressure in the passage 13, a port 14 may be provided, so that fluid pressure in passage 13 can escape through the other end of the conduit 12.

Instead of employing the piston head 6 and the corrugated tubing 7, a piston 15 acted upon by a coil spring 16, as shown in Fig. 3, may be employed; the operation being evidently the same as that of the first described construction.

The spring pressure of the corrugated tubing 7 or the spring 16 may be made of such force that the valve 2 can be held to its seat against fluid pressure tending to unseat same, without employing the balancing passage 11, but balancing the fluid pressures is considered more desirable, since the pressure of fluid flowing through the conduit may vary, while the pressure of a spring would remain substantially fixed.

Having now described my invention, what I claim as new, and desire to secure by Letters Patent, is:—

1. A plug cock comprising a body, a plug valve mounted in said body for controlling a fluid pressure conduit, a chamber at one end of the valve containing a lubricant, a movable member acting on said lubricant, and a passage for supplying fluid under pressure from the conduit to said member.

2. A plug cock comprising a body having a conduit, a plug valve mounted in said body, having a port for establishing communication through said conduit and having one end open to a chamber adapted to contain a lubricant, a yielding member acting on said lubricant, and a passage connecting said port with the conduit at one side of the valve when the valve is in its closed position.

In testimony whereof I have hereunto set my hand.

HENRY H. WESTINGHOUSE.